Sept. 1, 1959  A. H. FRÖHLICH ET AL  2,901,771
BAGLESS VULCANIZING PRESS
Filed March 18, 1957  5 Sheets-Sheet 1

INVENTORS
ADOLF H. FRÖHLICH &
EDWARD J. HARRIS
BY
ATTORNEY

Sept. 1, 1959 A. H. FRÖHLICH ET AL 2,901,771
BAGLESS VULCANIZING PRESS
Filed March 18, 1957 5 Sheets-Sheet 3

INVENTORS
ADOLF H. FRÖHLICH &
EDWARD J. HARRIS
BY
*J. William Freeman*
ATTORNEY

INVENTORS
ADOLF H. FRÖHLICH &
EDWARD J. HARRIS
BY
ATTORNEY

United States Patent Office 2,901,771
Patented Sept. 1, 1959

2,901,771

BAGLESS VULCANIZING PRESS

Adolf H. Fröhlich and Edward J. Harris, Akron, Ohio

Application March 18, 1957, Serial No. 646,747

7 Claims. (Cl. 18—17)

This invention relates to the art of pneumatic tire vulcanizing equipment, and in particular has reference to improved types of pneumatic tire vulcanizers wherein the use of a pneumatic former is obviated.

In the past the manufacture of pneumatic tires has been effectuated by first forming a plurality of fabric plies in flat form so as to build up a plurality of such layers in what is conventionally referred to as a "flat built" tire. This "flat built" tire is then positioned in a vulcanizing press in order that the same may be shaped to a toroidal configuration by the use of a pneumatic former that is automatically positioned interiorly of the tire during the vulcanizing operation.

While the above type of structure has generally been accepted, the same has been found to be disadvantageous in that it requires the use of a relatively complex mechanism to effectuate the timed entrance and withdrawal of the pneumatic former. Additionally, such formers have been found to have a relatively short duration of use and must be accordingly replaced frequently to thus add to the over-all cost of manufacturing with an attendant increase in the cost of the over-all tire per se.

It has been proposed in the past to vulcanize pneumatic tires without the use of a pneumatic former of the type above described. However, generally such efforts have been unsatisfactory from a commercial acceptability standpoint in view of the fact that it was heretofore impossible to provide an efficient type of inner bead ring mechanism that would serve the dual purpose of creating an air-tight seal at the bead area of the tire being cured, while simultaneously being easy to insert and withdraw prior to and after the completion of the vulcanising cycle.

In co-pending applications of Adolf Frohlich and Edward J. Harris for Expandable Bead Ring for Vulcanizing Press, Serial No. 530,381, filed August 24, 1955, and Expendable Inner Bead Forming Ring for Vulcanizing Presses, Ser. No. 564,955, filed February 13, 1956, there were disclosed certain improved types of bead rings that were capable of having the over-all effective diameter thereof reduced so as to permit entry of the same between the beads of a flat built tire prior to the point of installation.

While the above type of bead ring has been found satisfactory in usage, it has been found that equivalent results can be obtained by utilizing an improved type of collapsible structure of a more simplified nature.

Specifically in this regard it has been found that by providing a series of arcuate segments that are respectively supported on a plurality of link arms pivotally arranged in a circular course, that an improved type of sealing ring can be obtained upon collapsing and pivoting of the link members in a manner that will be more fully set forth in the accompanying specification.

It accordingly becomes a principal object of this invention to provide an improved type of bagless vulcanizing press characterized by the movement of a series of arcuate segments into and out of a condition of juxtaposition with each other upon closing and opening of the press.

It accordingly is a still further object of this invention to provide a bagless vulcanizing press of the type above described wherein the mechanism provided automatically operates to strip the tire from the matrix sections at the completion of the vulcanizing cycle.

It is a still further object of this invention to provide a vulcanizing press of the bagless type that is characterized by an extreme simplicity in operation combined with a high degree of operating efficiency.

These and other objects of the invention will become more apparent upon a reading of the following brief specification considered and interpreted in the light of the accompanying drawings.

Figure 5:
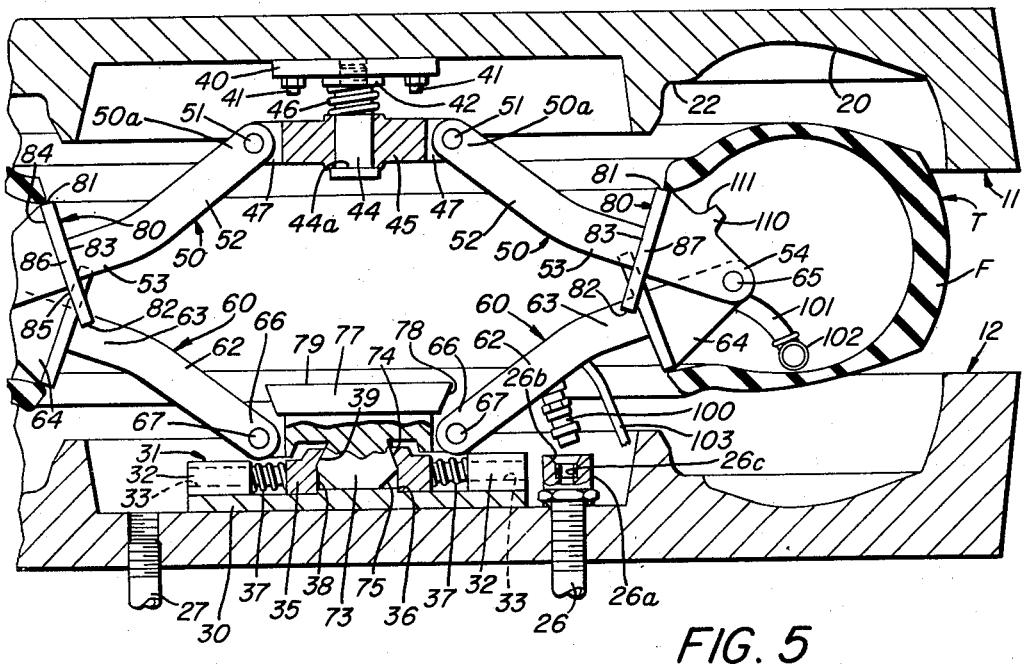
Figure 6:
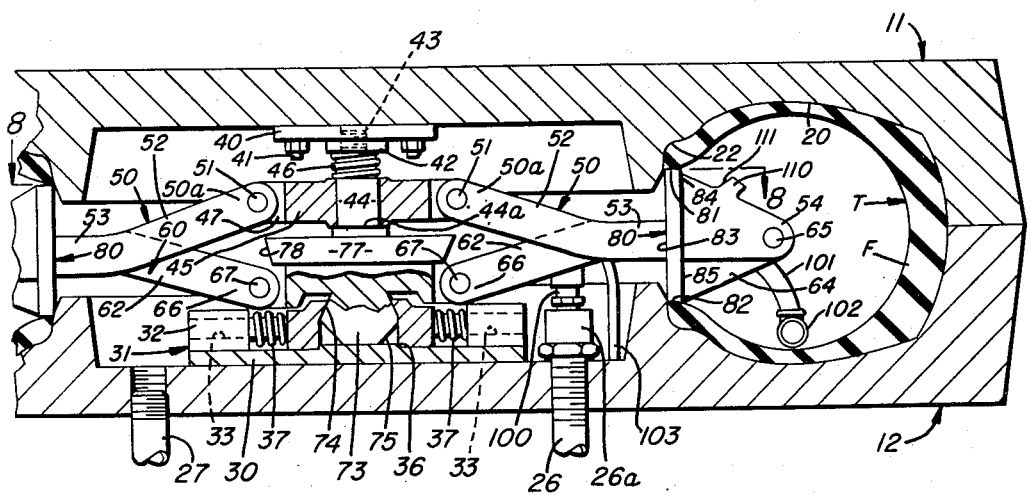
Figure 7:
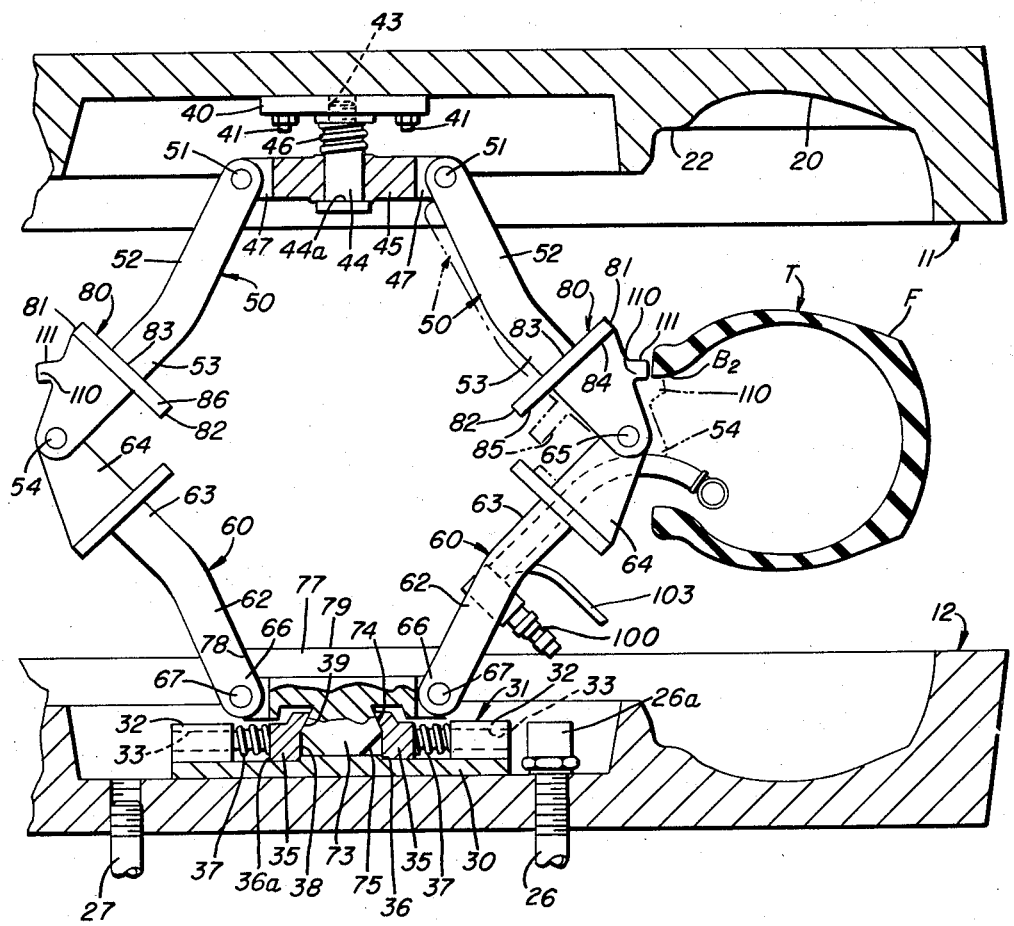

Figures 5, 6, and 7 are partial sectional elevations of a modified form of the bead ring and showing the same in the fully open, intermediate, and closed positions.

Figure 8:
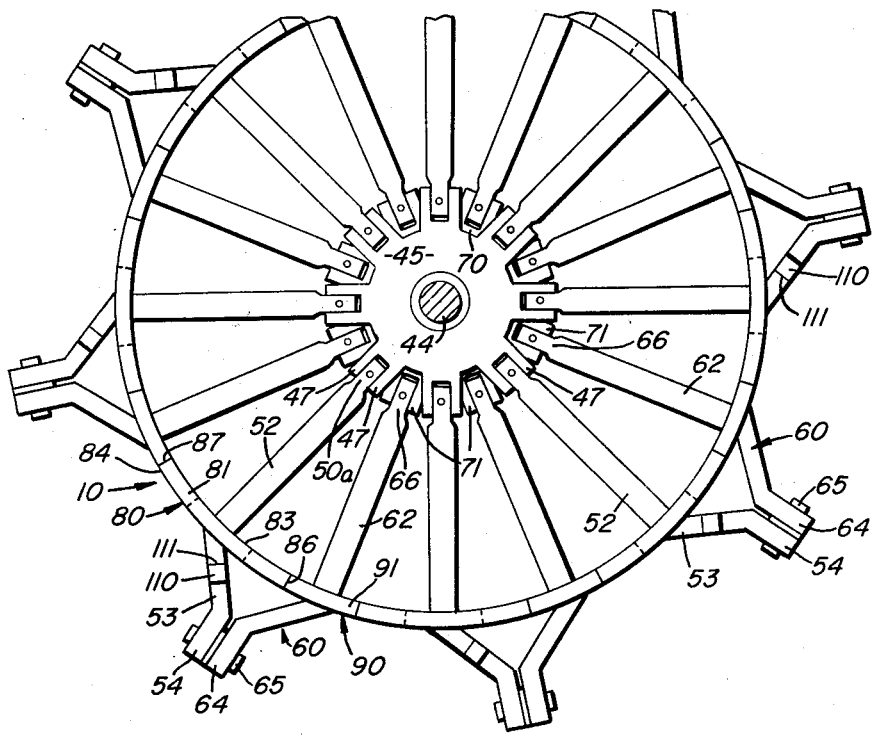

Figure 8 is a view taken on the lines 8, 8 of Figure 6.

Figure 9:
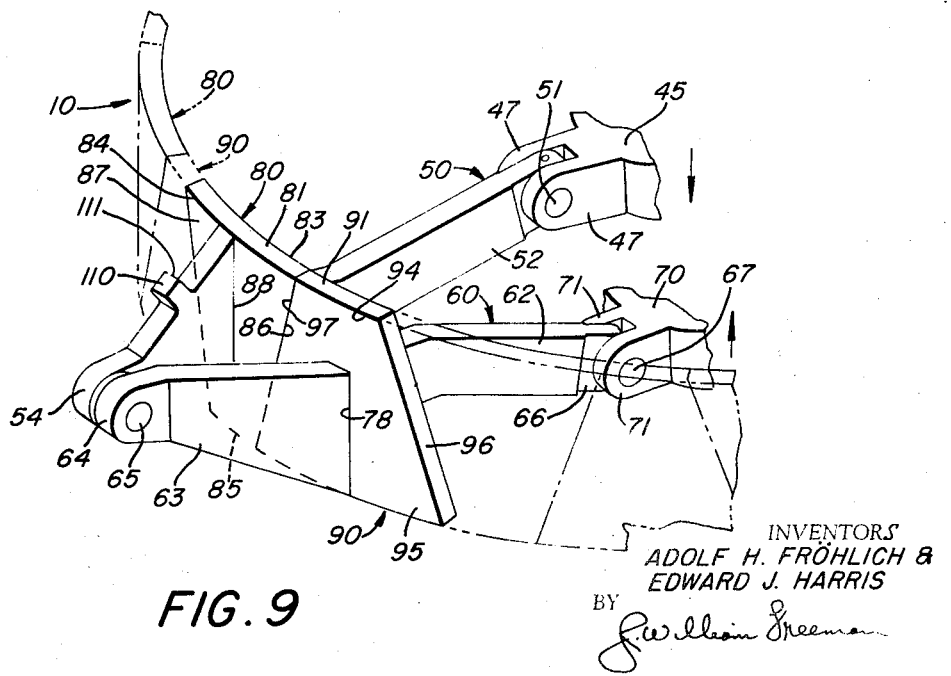

Figure 9 is a perspective view of a pair of arms and sealing ring segments of the modified form of the invention.

Referring now to the drawings, and in particular to Figures 1 to 4 thereof, the improved bead ring, generally designated by the numeral 10, is shown suspended from the upper mold section 11 of a vulcanizing press so as to be engageable against the bead portions of a tire T upon coaction between a lower mold section 12 and a lower portion of the bead ring 10, as will presently be described.

Considering first certain points of the press structure that are unrelated to the improved bead ring 10, it will be seen that the upper mold and lower mold sections 11 and 12, respectively, include design imparting surfaces 20 and 21 as well as the usual bead seats 22 and 23. Additionally, the mold sections 11 and 12 are shown provided with integral central plates 24 and 25; the arrangement being such that the plate 24 serves as a support mount for the bead ring 10 as will presently be described, while the lower plate 25 is apertured to receive a condensate line 26 and a steam inlet line 27. In this regard, it is to be noted that when the mold sections are in the closed position of Figure 2, a complete annular chamber is formed by these mold sections with the usual central aperture being eliminated.

Figure 1:
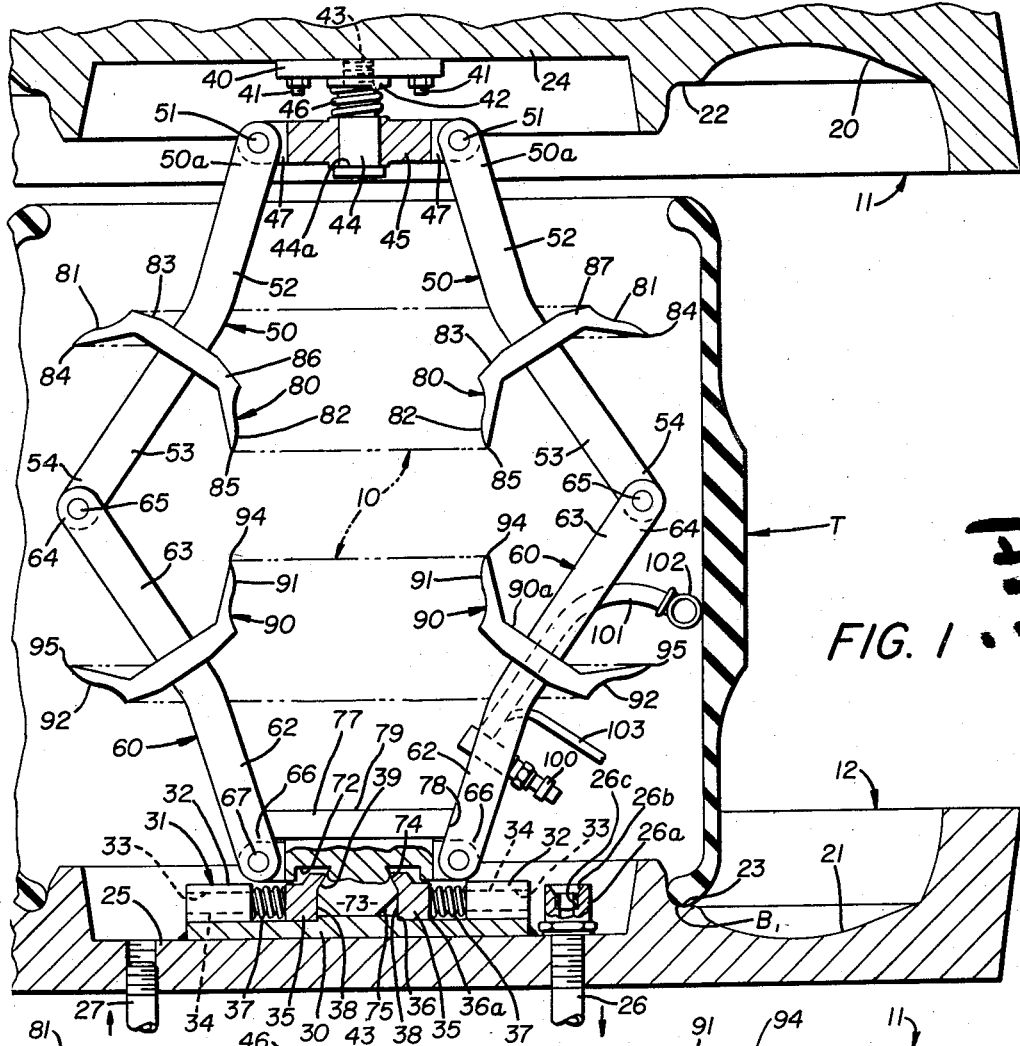
Figure 1 is a partial sectional view through a vulcanizing press equipped with an improved vulcanizing ring and showing the press in an open condition.
Figure 2:
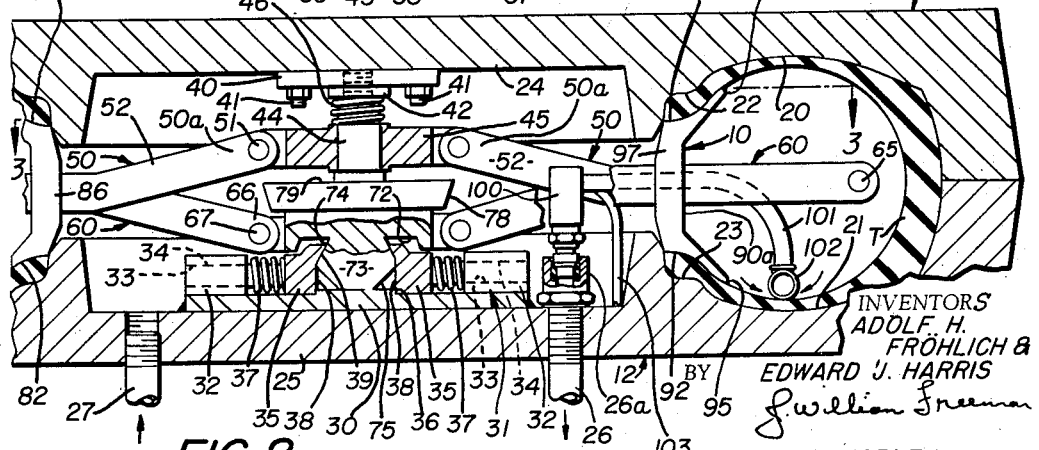
Figure 2 is a view similar to Figure 3 but showing the press in a closed condition.

In addition to the aforementioned component parts, the plate member 25 also supports thereon, as is best shown in Figures 1 and 2 a plate 30, upon which may be mounted clamping means indicated generally by the numeral 31. In view of the fact that these clamping means 31 coact with a portion of the bead ring 10 as will presently be described, the same are shown defined by a plurality of block members 32, 32 that are apertured, as at 33, 33, so as to permit reception therein of the shaft portion 34, 34 of clamping lugs 35, 35. As is best shown in Figures 1 and 2, the extent of movement of these clamping lugs is determined by shoulders 36, 36 that are provided on plate 30 while separate shoulders 36a, 36a, seat springs 37, 37 that continuously urge the shafts 34, 34 inwardly as shown in the drawing. It will also be noted that each innermost edge surfaces 38, of the clamping lugs 35, 35, further includes an inclined surface 39, 39 that coacts with certain component parts of the sealing ring 10 as will be more fully described.

It is also to be noted with regard to the construction of the condensate line 26 that the same further includes a fitting 26a that has a flared mouth opening 26b for the purpose of receiving a complemental fitting that is provided on the bead ring 10 as will presently be described, it being the intention here that this adaptor 26a serves as a releasable fitting that is engageable during the closing operation of the press. To this end a resilient bushing 26c is provided internally of the same for the purpose of sealing the connection at this point in a manner known and thought in the above referred to copending applications.

Turning now to the detailed construction of the bead ring 10, it will be first noted that the over-all ring unit 10 freely depends from the upper mold section 11 for coaction with the lower mold section 12 upon relative movement therebetween as in opening and closing of the press.

To this end the central portion 24 of upper mold section 11 is shown receiving an adapter plate 40 that is secured thereto in known manner by bolts 41, 41. The plate 40 includes a central boss 42 that is apertured as at 43 for reception of the threaded end of a pin 44. Receivable around the pin 44, as is best shown in Figures 1 and 2, is a mounting ring 45 that rests against the head 44a of pin 44 under the influence of spring pressure created by spring 46.

Figure 3:
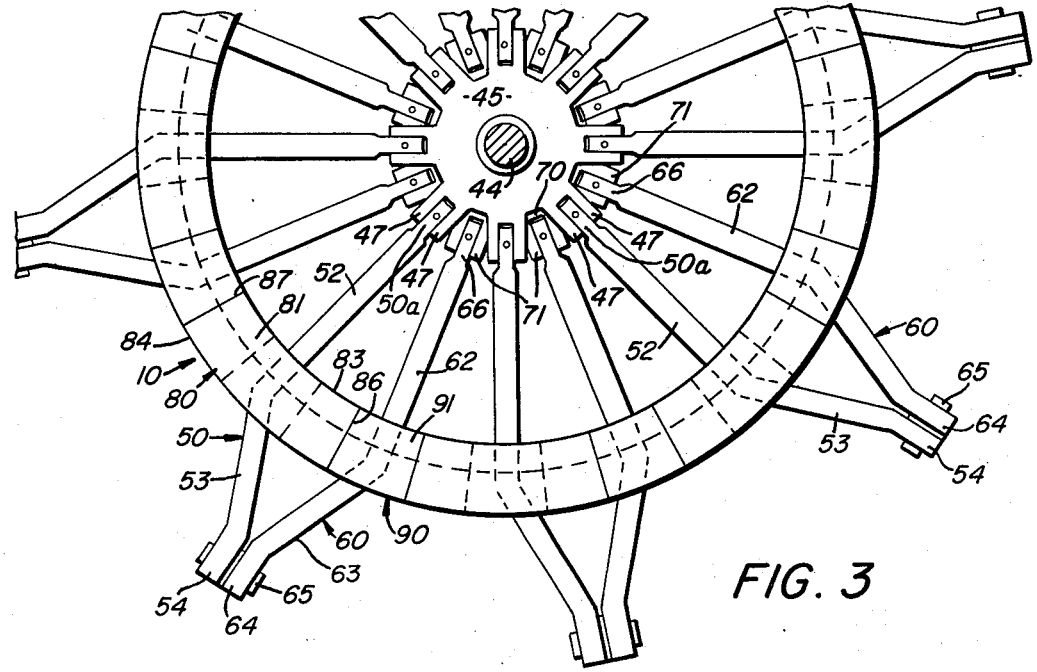
Figure 3 is a view taken on the lines 3—3 of Figure 2.
Figure 4:
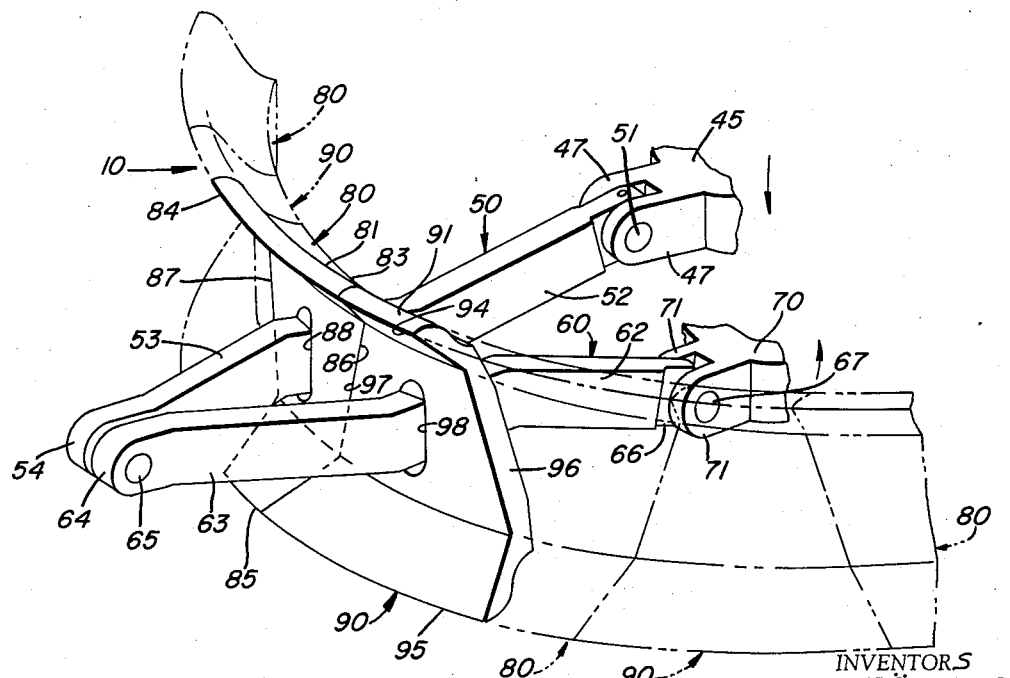
Figure 4 is a perspective of a pair of arms and sealing ring segments.

To the end of supporting the bead ring mechanism 10, the mounting ring has its circumferential periphery defined by a plurality of opposed lug members 47, 47, that are arranged in pairs, as shown in Figure 3, to facilitate the mounting therebetween of one end 50a of a link arm 50 with pin 51 being employed to facilitate such pivotal mounting. In this regard it is to be understood that several arms 50, 50 are provided and arranged around the axis of the ring 45 and pin 44 in a circular course.

Also, as shown best in the plan view of Figure 3, each link arm 50 includes a straight portion 52 as well as an angularly offset portion 53 that terminates in a mounting portion 54 for engagement with a second link arm as will presently be described.

While the link arm 50 is offset horizontally, as has just been described, it is also to be noted that a slighter degree of offsetting occurs in the substantially vertical condition of Figures 1 and 2, with the purpose of the offsetting just described being to facilitate reception thereon of bead ring segments, as will presently be described.

As has been previously indicated, the free end 54 of each link arm 50 is designed for pivotal connection with a second series of link arms that will each generally be designated by the numeral 60 with it being understood that the number of link arms 60, 60 being provided will be equivalent to the number of arms 50, 50.

With regard now to the detailed construction of the arms 60, 60, it will be noted that the same include, as best shown in Figure 3, a main or lowermost portion 62 as well as an offset portion 63 that terminates in an end portion 64 that is pivotally connected with respect to the free end 54 of the adjoining arm 50 through the medium of a pivot pin 65. As before in addition to the horizontal offset between the portion 62 and 63, there is also provided a vertical offset as is shown in Figures 1 and 2 of the drawings.

For the purpose of facilitating description, the lowermost ends of each arm 60 (Figures 1 and 2) have been designated with the numeral 66 and, as clearly shown in the drawings, these lowermost ends 66, 66, are pivotally mounted about a mounting ring 70 that is somewhat similar in basic configuration to the previously described mounting ring 45. In this regard it is to be understood that the mounting ring 70 includes a plurality of projecting lugs 71, 71, arranged in pairs and pivotally receiving therebetween the ends 66, 66, of the arms 60 with pivot pins 67 being employed to facilitate the just described connection.

In addition to the aforementioned component parts, the mounting ring 70 is further shown undercut as at 72 so as to define axially projecting lug 73 that is designed for releasable engagement with the clamping means 31 as will now be described. Accordingly, the plug 73 is shown including converging conical surfaces 74 and 75, with the surface 74 being designed to snap into wedged engagement with the previously described surface 39, as is clearly shown in Figure 1 of the drawings. In this regard the conical surface 75 operates to radially spread the clamping lugs 35, 35 against the force of the individual spring members 37, 37.

The opposed axial face of the mounting ring 70, has abutted thereon, a circular plate 77, that has its peripheral adge defined by a conical surface 78 so as to permit limiting of the pivotal movement of the arm 60, during relative movement of the mold sections, with the uppermost surface 79 of the plate 77 being designed for coaction with head 44a as will presently be described.

As has been previously indicated, the link arms 50, 50 and 60, 60 are designed to receive arcuate bead segments, with the arrangement being such that these bead segments will, upon collapsing movement of the link arms, intermesh together to define an annular bead ring that is located between the opposed bead seats 22 and 23 and that is defined by a series of juxtapositioned bead segments.

To this end each arm 50 carries an arcuate beam section 80, while each lower arm 60 carries an arcuate bead segment 90. While the cross sectional configuration of these bead segments 80, 80 and 90, 90 are illustrated in Figures 1 and 2, reference is made to Figures 3 and 4, for a detailed consideration of the various planar configurations of these component parts.

Accordingly, as shown in Figure 1, each segment 80 includes an arched bead face 80a, that includes opposed bead-engaging edges 81 and 82 that are contoured for reception against the inner bead wall of the tire when the same is positioned as shown in Figure 2. The radially innermost portion of each segment 80 is designated by the numeral 83, while the leading or front portions adjacent the surfaces 81 and 82 are designated by the numerals 84 and 85 respectively. In this regard if reference will now be made to Figure 4 of the drawings, it will be noted that the arcuate length of the surface 84 is considerably greater than the arcuate length of the surface 85, thus indicating that the individual segments 80, 80 have their sides 86 and 87 tapered to facilitate juxta-position with the segments 80, 80.

It accordingly follows that each bead segment 90 has a complemental arched bead face 90a that includes opposed bead surfaces 91 and 92 that commonly terminate at their front or leading side in edge surfaces 94 and 95. Once again referring to Figure 4, it will be noted that the length of these surfaces 94 and 95 is reversed with respect to the segments 80, 80, with the surface 94 being considerably shorter so as to define tapered side surfaces 96 and 97 that are designed for abutment with the adjacent bead segments 80, 80. In addition to the aforementioned component parts, each segment 80 is centrally slotted as at 88 to facilitate reception around the link arm 50, while a similar slot 98 is provided in each segment 90 for reception of the link arm 60.

For the purpose of facilitating the withdrawal of condensate occurring interiorly of the closed chamber defined by closed mold sections 11 and 12, one arm 60 is shown provided with a male plug 100 that is designed for releasable engagement within previously described female adapter 26, as illustrated in Figure 2 of the drawing. Leading outwardly from the male adapter 100 is a main condensate pick-up head 102, that will be received in the lowermost portion of the annular cavity inside of the tire, as clearly shown in Figure 2 of the drawings. An auxiliary pick-up tube 103 branches off the main pick-up tube 101 for the purpose of drawing up condensate occurring on the innermost face of plate 25.

Operation of the device

In use or operation of the improved bead ring, it will first be assumed that the component parts of the same have been secured to a vulcanizing press as above described. Accordingly, at this time a flat built tire T may have its lowermost bead portion $B_1$ placed on the bead seat 23 and with the press partially closed, as shown in Figure 1 of the drawings, the bead ring 10 will be disposed interiorly of the upright tire T as shown in Figure 1. At this point the plug 73 is out of contact with the clamping means 31, but as further lowering of the upper mold section 11 continues, it is believed apparent that contact will be made between the conical surface 75 and the radially arranged clamping heads 35, 35. Initially this contact will not be of sufficient force to overcome the springs 37, 37, so during the initial closing of the press the plug 73 will not be seated within the clamping means 31.

As further lowering movement of the upper mold section 11 continues, it is believed apparent that two things will happen. First, there will be pivotal movement of the arms 50, 50 and 60, 60 with respect to each other and the mounting rings to which the same are attached, to thus initiate preliminary radially outward movement of the pivot pins 65. Secondly, at such time as the upper bead seat 22 engages the upper bead $B_2$ of the tire, there will be a central expansion of the tire toward a toroidal condition, with such movement preferably being assisted by the introduction of vulcanizing medium through line 27.

As further downward movement of the mold sections occurs, it is believed apparent that additional movement of both the link arms and the tire will continue toward the position of Figure 2. However, just before the position of Figure 2 is finally approached, and with the link arms and tire closely approaching the condition of Figure 2, the head 44a will strike the upper surface 79 of stop plate 77 and during the positive final closing of the mold section 11, the clamping beads 35, 35 will be radially urged outward through the force applied by the conical surface 75. When the surface 75 has passed its maximum width, the springs 37, 37 will urge the clamping heads inwardly so that the same have the surfaces 39, 39 thereof wedged against the conical surface 74 as shown in Figure 2 of the drawings.

At this point full vulcanization may commence with condensate pick-up being facilitated by conduit members 101 and 103 during the period of vulcanization.

After the vulcanization cycle has been completed, it is merely necessary that the upper mold section be raised and during the raising thereof, the following sequence of events will occur.

First, the mold section 11, will be stripped with regard to the uppermost surface of the tire T, with the bead portion $B_2$ being first disengaged from bead seat 22 with the progressive stripping of the remaining upper half of the upper mold section following. After this initial stripping with respect to the upper mold section 11, it is believed apparent that further upward movement of the press 11, will result in separating movement of the link arms 50, 50 and 60, 60, and during this separating movement of the link arms 50, 50 and 60, 60 it is believed apparent that the entire tire T, will be carried upwardly from the lower mold section 12, so as to be automatically stripped from the same. After this stripping action, the cured tire T, will loosely hang on the bead segments 80, 80 and 90, 90. However, when a condition similar to Figure 1 is reached in opening, it is believed apparent that the effective diameter of the bead segments 80, 80 and 90, 90 will be smaller than the bead diameter of the cured tire T, with the result that the same will fall off these segments and be loosely positioned on the lower mold section 12.

At such time as the portions 62, 62 of arm 60, 60 strike the conical surface 78 of plate 77, further pivotal movement thereof will be precluded and accordingly further upward movement of the press will result in the plug 73 being snapped out of engagement with the clamping means 31, at which time the over-all bead ring 10 will hang freely from the upper mold section 11, which may then be completely opened, at this time, the press will be adapted for removal of the cured tire and insertion of another carcass thereon for repetition of the above described cycle of events.

The modified form of the invention shown in Figures 5 through 9 inclusive is substantially similar to that previously described and accordingly a detailed recitation of the same will not be set forth, it being understood that where equivalent numerals are indicated, it is intended that equivalent operation is to be understood.

This modified form of the invention is designed for use in connection with the recapping of pneumatic tires that have already been formed in toroidal configuration, and accordingly, it is first necessary that the formed tire F be suspended above the lower mold section 12 during the preliminary operation of partially closing the press. Specific means capable of utilization in this regard are not disclosed, it being understood that a swing-arm-type of tong mechanism could be employed or that the tire could be tensionally raised with respect to the lower mold section by use of a spring loaded ring extending axially therefrom. The construction of the press and bead ring 10 is, as previously indicated, similar to that previously described with the exception of certain modifications in the detailed structure of the bead segments 80, 80 and 90, 90. In this regard the bead segments 80, 80 are each shown including a lug member 110 that has a work-engaging face 111, with the purpose of this work-engaging face being to engage the underside of the bead portion $B_2$ for effectually stripping the tire T from the lower mold section 12. As before shown, after radial decrease in the effective diameter of the bead ring 10, the cured tire will drop off of the ring unit and fall upon the lower mold section 12.

In this regard, while the segments have been separately described for the sake of clarity, it is to be understood that the same are interchangeable with each other.

It will be seen from the foregoing that there has been provided a new and novel type of collapsible bead ring for use in bagless vulcanizing equipment. It has been shown how the bead ring is defined by a plurality of arcuate segments that intermesh together to form a continuous bead ring capable of being positioned between opposed bead seats of the mold sections and being defined by juxtapositioned arcuate bead segments. It has further been shown how the use of this intermeshing type of structure additionally operates to facilitate complete stripping of the tire with respect to both the mold sections and the bead ring unit.

While a full and complete disclosure has been set forth in accordance with the dictates of the patent statutes, it is to be understood that the invention is not intended to be limited to the specific embodiments recited herein. Accordingly, other modifications of the invention may be resorted to without departing from the spirit hereof or the scope of the appended claims.

What is claimed is:

1. A vulcanizing press of the character described, comprising; a pair of complemental relatively moveable mold sections having opposed bead seats for receiving the bead portions of a pneumatic tire; a collapsible bead ring carried by one said mold section and being positioned in maximum diameter condition between said beads upon closing of said press; and ejectment means carried by said ring and stripping a tire positioned against said bead seats upon opening of said press; said ejectment means including a plurality of lug members provided on said collapsible bead ring.

2. A vulcanizing press of the character described, comprising; a pair of relatively moveable mold sections defining when closed an air tight annular chamber; a first mounting ring secured to said upper mold section in axially shiftable relationship therewith; a first series of link arms pivotally connected to said first ring and depending therefrom in a circular course; a second series of link arms pivoted to the free ends of said first series of link arms; a second mounting ring pivotally connecting with the free ends of said second series of link arms and with said free ends being arranged in a circular course around said second mounting ring; a first series of bead segments each carried intermediate one said link arm of said first series of link arms; a second series of bead segments each carried intermediate one said link arm of said second series of link arms; said first and second series of bead segments intermeshing to define an annular bead ring upon relative axial movement between said first and second mounting rings; clamping means carried by said lower mold section and releasably engaging said second mounting ring; stop means limiting pivotal movement of said second series of link arms said first and second series of bead ring segments being axially separated when said mold sections are separated.

3. A vulcanizing press of the character described, comprising; a pair of relatively moveable mold sections defining when closed in an air tight annular chamber; a first mounting ring secured to said upper mold section in axially shiftable relationship therewith; a first series of link arms pivotally connected to said first ring and depending therefrom in a circular course; a second series of link arms pivoted to the free ends of said first series of link arms; a second mounting ring pivotally connecting with the free ends of said second series of link arms and with said free ends being arranged in a circular course around said second mounting ring; a first series of bead segments each carried intermediate one said link arm of said first series of link arm; a second series of bead segments each carried intermediate one said link arm of said second series of link arms; said first and second series of bead segments intermeshing to define an annular bead ring upon relative axial movement between said first and second mounting ring; clamping means carried by said lower mold section and releasably engaging said second mounting ring said first and second series of bead ring segments being axially separated when said mold sections are separated.

4. A vulcanizing press of the character described, comprising; a pair of relatively moveable mold sections defining when closed an air tight annular chamber; a first mounting ring secured to said upper mold sections in axially shiftable relationship therewith; a first series of link arms pivotally connected to said first ring and depending therefrom in a circular course; a second series of link arms pivoted to the free ends of said first series of link arms; a second mounting ring pivotally connecting with the free ends of said second series of link arms and with said free ends being arranged in a circular course around said second mounting ring; a first series of bead segments each carried intermediate one said link arm of said first series of link arms; a second series of bead segments each carried intermediate one said link arm of said second series of link arms; said first and second series of bead segments intermeshing to define an annular bead ring upon relative axial movement between said first and second mounting rings; stop means limiting pivotal movement of said second series of link arms said first and second series of bead ring segments being axially separated when said mold sections are separated.

5. A vulcanizing press of the character described, comprising; a pair of relatively moveable mold sections defining when closed an air tight annular chamber; a first mounting ring secured to said upper mold section in axially shiftable relationship therewith; a first series of link arms pivotally connected to said first ring and depending therefrom in a circular course; a second series of link arms pivoted to the free ends of said first series of link arms; a second mounting ring pivotally connecting with the free ends of said second series of link arms and with said free ends being arranged in a circular course around said second mounting ring; a first series of bead segments each carried intermediate one said link arm of said second series of link arms; said first and second series of bead segments intermeshing to define an annular bead ring upon relative axial movement between said first and second mounting rings said first and second series of bead ring segments being axially separated when said mold sections are separated.

6. A vulcanizing press of the character described, comprising; a pair of relatively moveable mold sections defining when colsed an air tight chamber; a first mounting ring secured to said upper mold section in axially shiftable relationship therewith; a first series of link arms pivotally connected to said first ring and depending therefrom in a circular course; a second series of link arms pivoted to the free ends of said first series of link arms; a second mounting ring pivotally connecting with the free ends of said second series of link arms and with said free ends being arranged in a circular course around said second mounting ring; a first series of bead segments each carried intermediate one said link arm of said first series of link arms; a second series of bead segments each carried intermediate one said link arm of said second series of link arms; said first and second series of bead segments intermeshing to define an annular bead ring upon relative axial movement between said first and second mounting rings; clamping means carried by said lower mold section and releasably engaging said second mounting ring; stop means limiting pivotal movement of said second series of link arms; means for controlling the entrance and discharge of vulcanizing medium into said air tight chamber; said means including an exhaust line carried by one said arm and being connected to a fixed exhaust line on one said mold section when pivotal movement of said arm said first and second series of bead ring segments being axially separated when said mold sections are separated.

7. A vulcanizing press of the character described, comprising; a pair of relatively moveable mold sections defining when closed an air tight annular chamber; a first mounting ring secured to said upper mold section; a first series of link arms pivotally connected to said first ring and depending therefrom in a circular course; a second series of link arms pivoted to the free ends of said first series of link arms; a second mounting ring pivotally connecting with the free ends of said second series of link arms and with said free ends being arranged in a circular course around said second mounting ring; a first series of bead segments each carried intermediate one said link of said first series of link arms; a second series of bead segments each carried intermediate one said link arm of said second series of link arms; said first and second series of bead segments intermeshing to define an annular bead ring upon relative axial movement between said first and second mounting rings said first and second series of bead ring segments being axially separated when said mold sections are separated.

References Cited in the file of this patent

UNITED STATES PATENTS

| | | |
|---|---|---|
| 1,101,732 | Doughty | June 3, 1914 |
| 1,625,894 | Hutchens et al. | Apr. 26, 1927 |
| 2,561,573 | Hovlid et al. | July 24, 1951 |
| 2,670,499 | Weigold et al. | Mar. 2, 1954 |
| 2,834,049 | White | May 13, 1958 |